Figure 1:
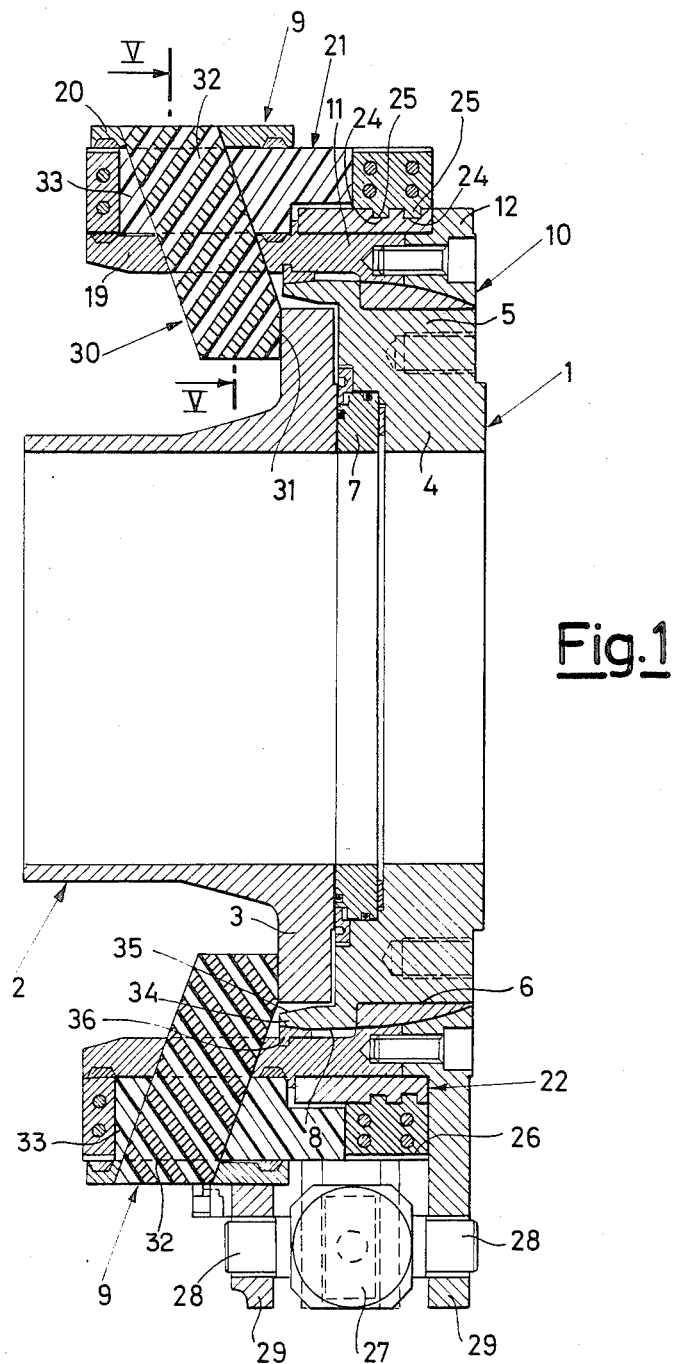

United States Patent [19]

Bormioli

[11] Patent Number: 4,722,557
[45] Date of Patent: Feb. 2, 1988

[54] QUICK CONNECTION UNION FOR FLANGED PIPES WITH AUTOMATIC COMPENSATION FOR COPLANARITY DEFECTS AND THICKNESS DIFFERENCES

[76] Inventor: Giorgio Bormioli, Via Galilei, 11-35100, Padova, Italy

[21] Appl. No.: 881,668

[22] Filed: Jul. 30, 1986

[30] Foreign Application Priority Data

Jul. 12, 1985 [IT] Italy ................. 21551 A/85

[51] Int. Cl.⁴ ............................................ F16L 23/00
[52] U.S. Cl. ........................................ 285/18; 285/920;
285/912; 285/364; 285/85
[58] Field of Search ................ 285/364, 18, 261, 271,
285/278, 85, 920, 912

[56] References Cited

U.S. PATENT DOCUMENTS

| | | | |
|---|---|---|---|
| 2,199,588 | 5/1940 | Cobham | 285/920 |
| 2,314,182 | 3/1943 | Yeomans | 285/261 |
| 2,370,354 | 2/1945 | Hurst | 285/364 |
| 2,864,630 | 12/1958 | Breitenstein | 285/261 |
| 3,479,005 | 11/1969 | De Graaf | 285/85 |
| 3,558,161 | 1/1971 | Bormioli | 285/320 |
| 3,615,107 | 10/1971 | Paddington | 285/364 |
| 3,661,408 | 5/1972 | Gibbons | 285/18 |
| 4,040,650 | 8/1977 | Shotbolt | 285/912 |
| 4,138,149 | 2/1979 | Bormioli | 285/320 |
| 4,139,221 | 2/1979 | Shotbolt | 285/18 |
| 4,142,740 | 3/1979 | Wilms | 285/18 |
| 4,153,278 | 5/1979 | Ahlstone | 285/18 |
| 4,202,567 | 5/1980 | Paddington | 285/18 |
| 4,222,591 | 9/1980 | Haley | 285/920 |
| 4,268,071 | 5/1981 | Hanchen | 285/18 |
| 4,306,739 | 12/1981 | Bormioli | 285/18 |
| 4,354,522 | 10/1982 | Bormioli | 137/614.02 |
| 4,426,063 | 1/1984 | Bormioli | 251/149.9 |
| 4,477,105 | 10/1984 | Wittman | 285/18 |
| 4,486,037 | 12/1984 | Shotbolt | 285/261 |
| 4,598,936 | 7/1986 | Doll | 285/920 |

FOREIGN PATENT DOCUMENTS

| | | | |
|---|---|---|---|
| 684319 | 4/1964 | Canada | 285/912 |
| 292025 | 2/1936 | Italy | 285/912 |
| 129517 | 10/1979 | Japan | 285/920 |
| 794551 | 5/1958 | United Kingdom | 285/364 |
| 01401499 | 9/1966 | United Kingdom | 285/912 |
| 2097884 | 11/1982 | United Kingdom | 285/18 |
| 2158535 | 11/1985 | United Kingdom | 285/261 |
| 271201 | 5/1970 | U.S.S.R. | 285/18 |

Primary Examiner—Gary L. Smith
Assistant Examiner—Eric K. Nicholson
Attorney, Agent, or Firm—Shlesinger Fitzsimmons Shlesinger

[57] ABSTRACT

A quick connection device has a supporting structure for connection elements constrained to the union body by means of radial engagement members engaged in a movable manner with a substantially spherical reaction surface of the union body. In this manner any coplanarity defect or difference in thickness of the end flange of the pipe to be connected is compensated for through appropriate rotation of the supporting structure of the quick connection device along said spherical surface.

6 Claims, 8 Drawing Figures

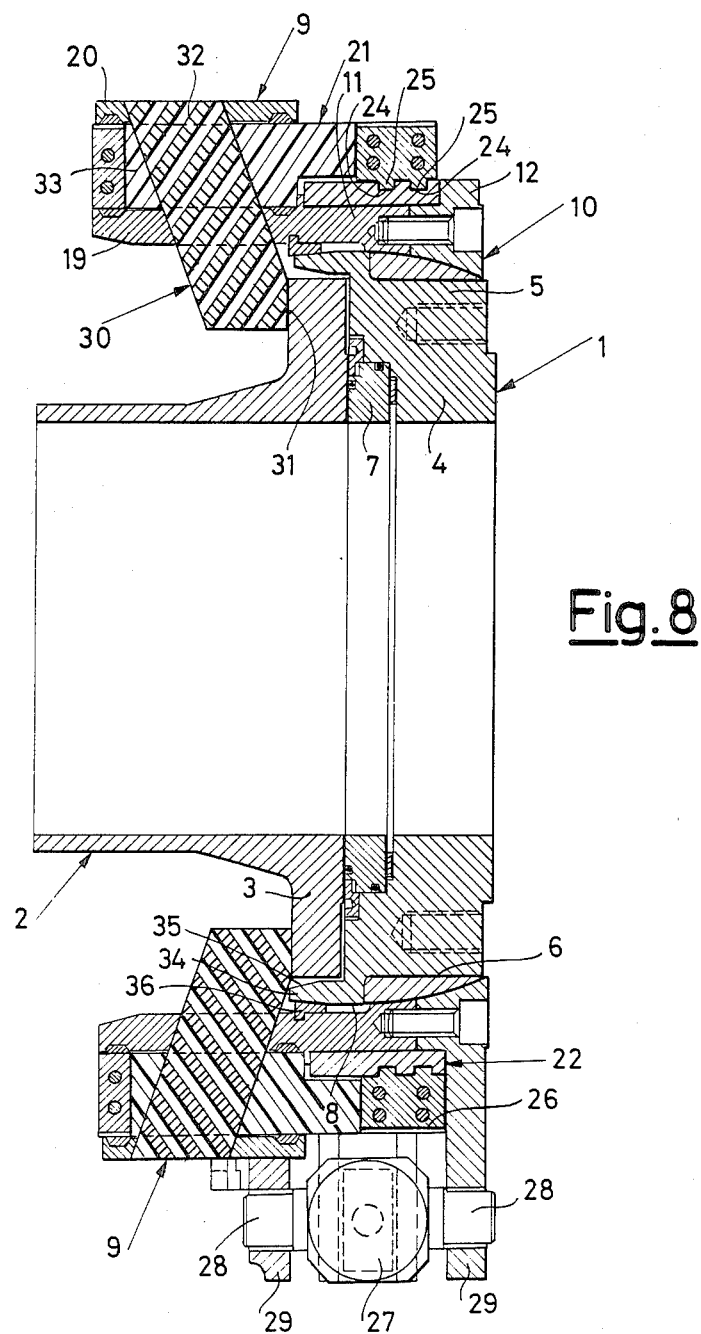

QUICK CONNECTION UNION FOR FLANGED PIPES WITH AUTOMATIC COMPENSATION FOR COPLANARITY DEFECTS AND THICKNESS DIFFERENCES

The present invention relates to a quick connection union for flanged pipes with automatic compensation for coplanarity defects and thickness differences.

Quick connection unions equipped with more or less sophisticated devices for quick connection or disconnection of a flanged pipe, which also ensure safety of controlled disconnection in severe applied load situations, are known.

Safety systems are also known which, apart from the quick connection and disconnection function, possess a feature which allows automatic disconnecting under a load higher than that of normal operation, e.g. resulting from pressure of the conveyed fluid, traction or torsion.

The existence of a safe automatic disconnection system makes useful and excessive the employment of a quick coupling device with the certainty of controlled disconnection under load, i.e. of a particularly complicated even if efficient type.

The object of the present invention is to accomplish a union with a quick connection device, which while foregoing the certainty of controlled disconnecton under load, offers various benefits from the design and functional viewpoint.

Another object of the present invention is in particular to achieve a quick connection union capable of safely connecting flanged pipes even if not perfectly coplanar or having slight differences in thickness.

Another object of the present invention is to accomplish a quick connection union capable of being connected to the pipe to be joined in the locked condition such that it will prevent undesired disconnection under load.

Another object of the present invention is to accomplish a quick connection union which would not have problems of undesired loosening of the locked condition in the presence of vibrations due for example to the pressure of the conveyed fluid.

Another object of the present invention is to accomplish a quick connection union of particularly simple but effective design and operation.

These and other objects of the present invention are achieved by means of a quick connection union comprising a union body which can be butted against an end flange of a pipe to be joined and a quick connection device associated with said union body and comprising an annular supporting structure with a plurality of connecting elements which can be controlled to act on said end flange to push it and lock it against said union body characterized in that said supporting structure for the quick connection device is engaged in a self centering-manner with a substantially spherical or segmental-spherical reaction surface of the union body.

In this manner the engagement elements of the quick connection device can adapt the position of said device to the form of the end flange of the pipe to be connected, moving along a spherical surface until it compensates for any coplanarity defects and thickness differences of said flange.

The coupling elements of the quick connection device are preferably made up of radially converging oblique segments engaged with longitudinal control bars through oblique teeth capable of converting an axial translation of said bars into a corresponding oblique radial translation of said segments with a parallel and simultaneous axial component in relation to that of said axial translation.

In this manner any disconnecting stress under load on the locking segments tends to increasingly lock the control bars in the connecting position, preventing the return thereof to the disconnecting position. The flanged pipe thus remains firmly attached to the union even under load.

Preferably the axial translation of the control bars is imparted by a single drive member consisting of a turning ring coaxial with the union body and with which the control bars are engaged by multi-start screws which convert the rotation of the ring into corresponding axial translations of the control bars.

There is thus obtained in an extremely simple manner and with a single operating member simultaneous translation of all the locking segments and correspondingly in the case of flanges which are not coplanar or of varying thickness rotation of the supporting structure of the quick connection device along the spherical reaction surface to compensate for coplanarity or thickness defects.

It should be noted that in the presence of vibrations, e.g. due to the pressure of the fluid conveyed, there could occur small undesired rotations of the turning ring and hence loosening of the locked condition.

To remedy this drawback there is preferably provided a locking system for the turning ring which is based on a one-way coupling which prevents counter-rotation of the turning ring when the connection has been made. Said one-way coupling is subsequently disconnectable only on order. The quick connection device is thus free of problems caused by vibrations.

Figure 2:
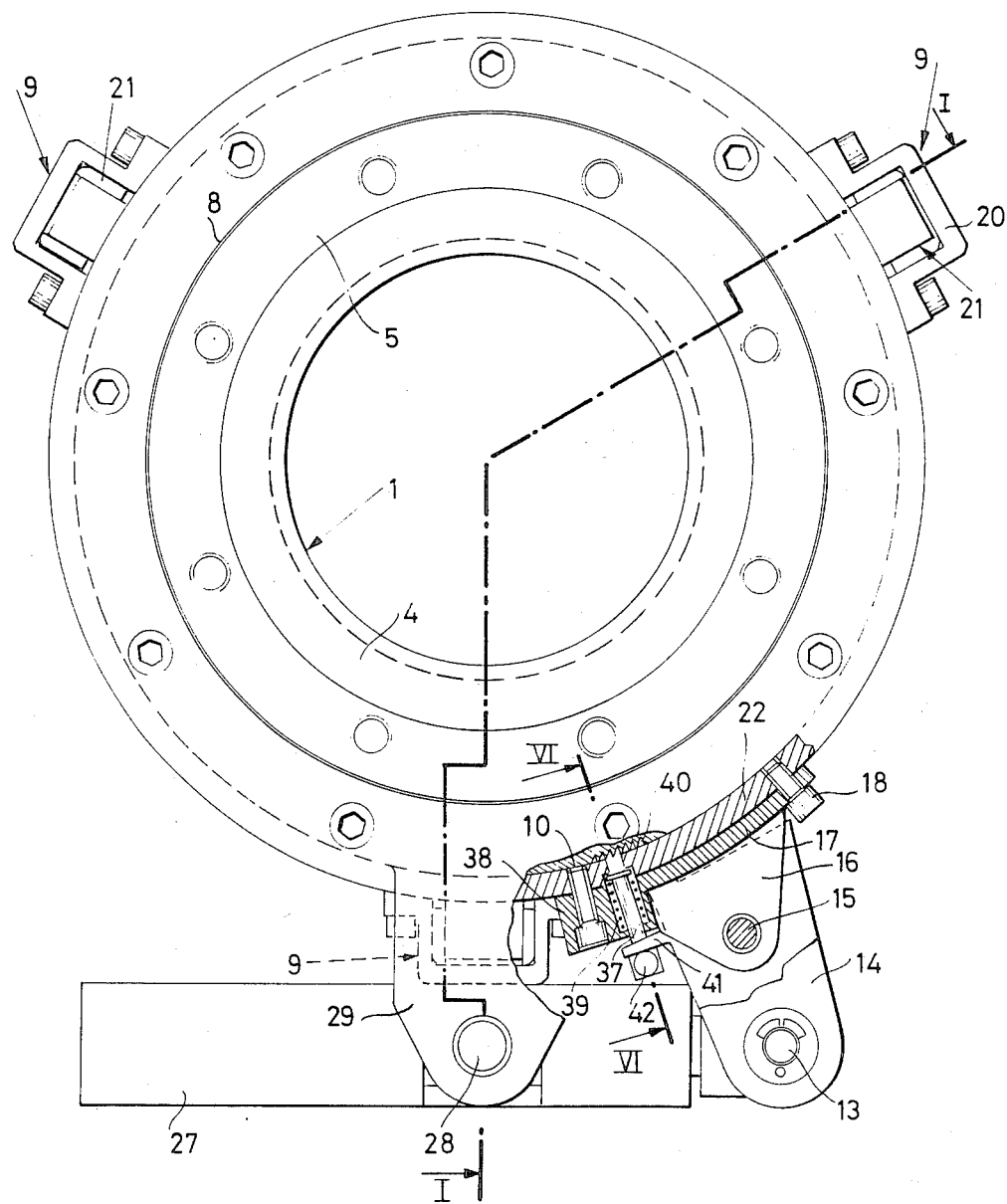
Figure 3:
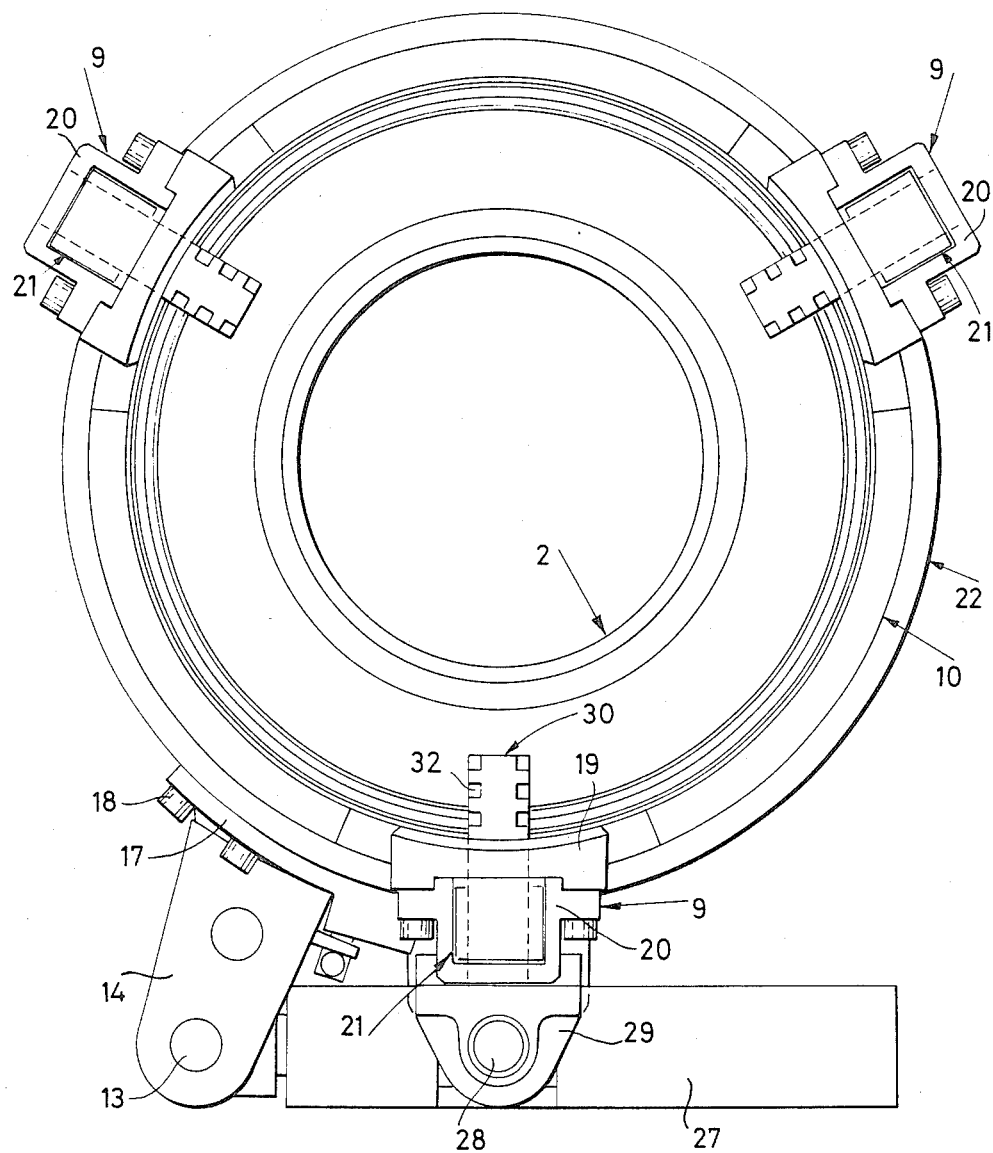
Figure 4:
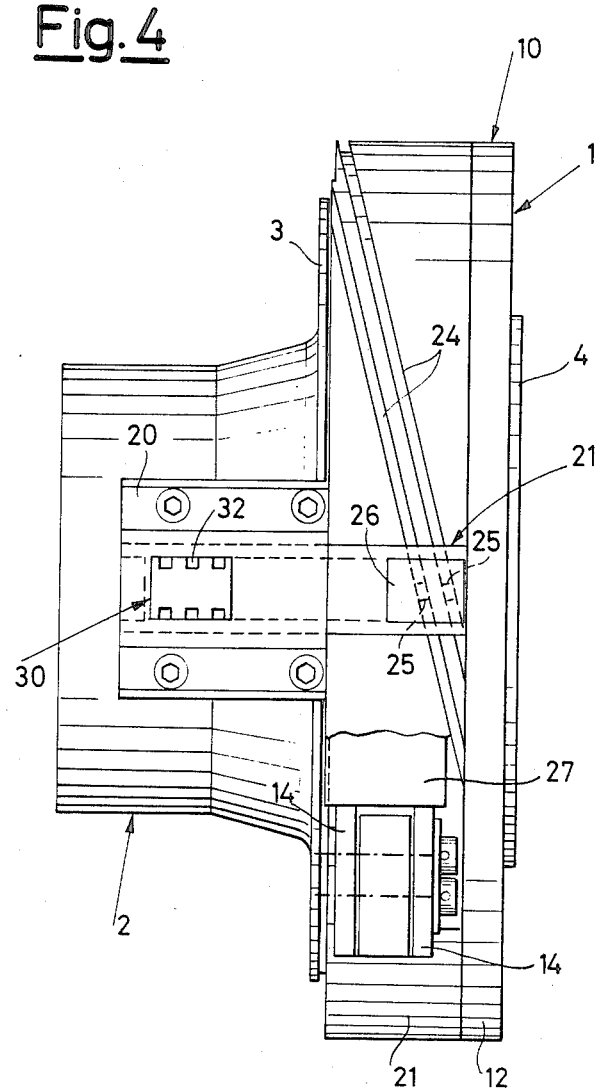
Figure 5:
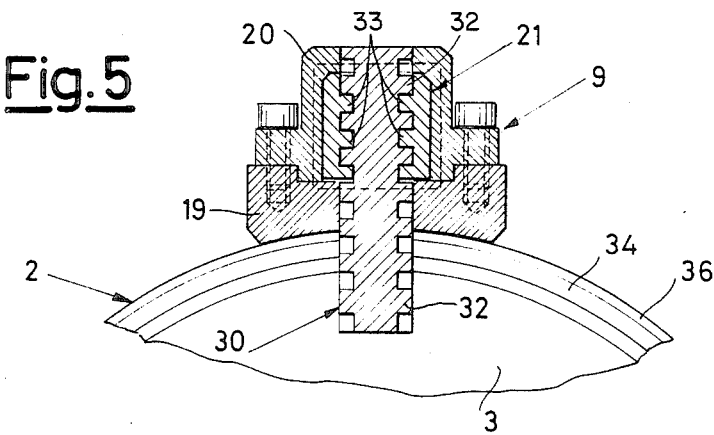
Figure 6:
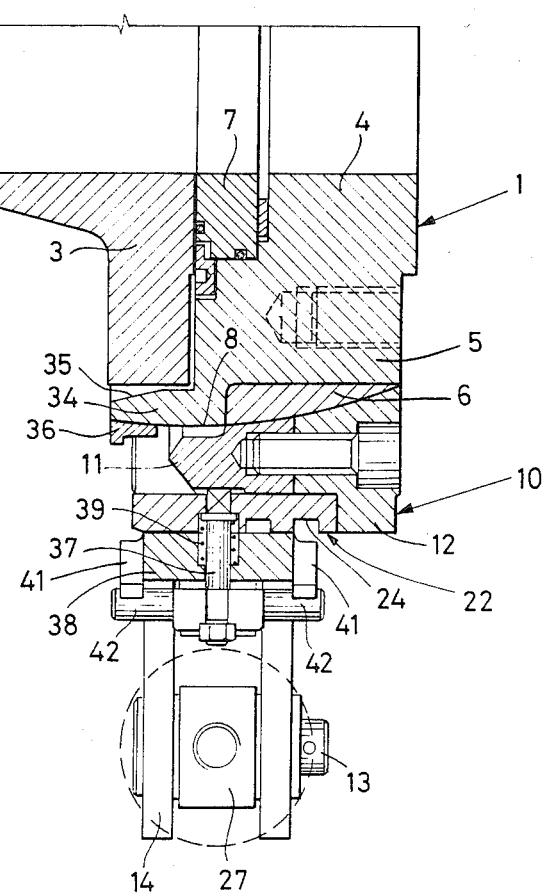
Figure 7:
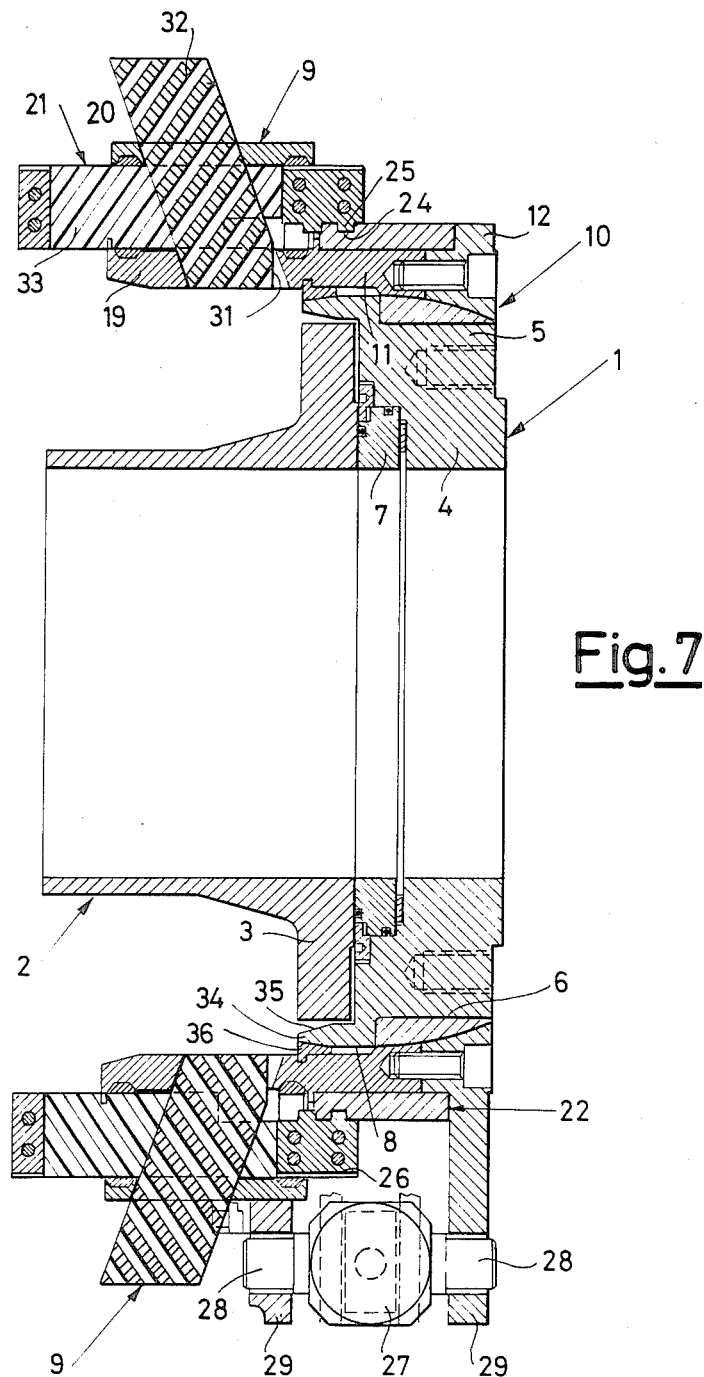

These and other characteristics of the present invention will be made clearer by the following detailed description of a possible practical embodiment thereof illustrated as an example in the annexed drawings wherein FIG. 1 shows an axial cross section of the union in accordance with the invention in the connected condition along line I—I of FIG. 2, FIG. 2 shows said union seen from the right in relation to FIG. 1, FIG. 3 shows said union seen from the left in relation to FIG. 1, FIG. 4 shows a bottom plan view of said union in relation to FIG. 1, FIG. 5 shows an enlarged sectional view along line V—V of FIG. 1 of a detail of the toothed coupling between the locking sgements and the associated control bars in the union represented in FIGS. 1 through 4, FIG. 6 shows a sectional view along line VI—VI of FIG. 1 of the detail of the one-way coupling which accomplishes the vibrationproof locking of the turning ring with the union in the connected condition, FIG. 7 shows the union illustrated in the above figures sectioned axially as in FIG. 1 but in the disconnected condition, and FIG. 8 shows said union sectioned axially but in the condition existing when a pipe is connected with a flange having irregular thickness.

The union illustrated in the drawings wherein it is indicated as a whole by the reference number 1 is designed for attachment to any pipe 2 fitted with an end flange 3 (FIG. 1).

The union 1 comprises a tubular body 4 fitted with a flange 5 designed to be secured frontally against the flange 3 of the pipe 2 and equipped with a seal ring 7 of a type known in itself (FIG. 1). The outer peripheral wall 8 of the flange 5 has therein an annular recess in which is secured an auxiliary bush or ring 6 having a spherical or segmental-spherical annular surface centred on the axis of the union.

With the flange 5 of the union 1 is associated a quick connection device made up of three coupling assemblies 9 made integral with an annular supporting structure 10 placed coaxially around the flange 5 of the union 1 and made in two parts 11 and 12 describing an inner annular wall sperical or segmental-spherical in form engaged with the aforesaid spherical annular surface of the flange 5 (FIG. 1).

As shown in FIGS. 1, 2, 3 and 4, from the supporting structure 10 at the three coupling assemblies 9 extend forward parallel to the axis of the union three sliding bases 19 fitted with respective covers 20 (FIGS. 3 and 5) for respective control bars 21 having a square cross section capable of translating linearly in a direction parallel to the axis of the union between the retracted position shown in FIG. 1 and the advanced position shown in FIG. 7.

Translation of all the bars 21 is brought about simultaneously by a single drive member made up of a ring or annular thrust block 22 of cylindrical shape which is engaged for rotation with the supporting structure 10 on which the ring 22 is mounted in a turning manner (FIG. 1). The outer face of the ring 22 has formed thereon multi-start screw threads or helical lands 24 (FIGS. 1 and 4) which slidably engage teeth 25 protruding from extensions, having cylindrical external faces 26, of the control bars 21 (FIG. 1). Rotation of the ring 22 is thus converted into corresponding axial translations of the three control bars 21.

Rotation of the drive ring 22 is provided by a hydraulic cylinder 27 (FIGS. 1-4) which reacts between the flange 5 of the union 1 and the turning ring 22. More precisely, the cylinder 27 has its outer body pivoted at 28 on fixed lugs 29 which are integral with the supporting structure 10 (FIGS. 1-3) and the head of the piston stem hinged at 13 on a pair of turning brackets 14 having their fulcrum at 15 on another pair of brackets 16 which are made integral with a connecting base 17 which is fixed to the turning ring 22 by means of screws 18.

As shown in FIGS. 2 and 6 with the turning ring 22 is associated a vibrationproof locking system which has the purpose of preventing counterrotation of the ring 22 from the angular position which corresponds to the connected condition of the union even in the presence of vibrations however produced. Said locking system consists of a sliding pin 37 which traverses radially a side extension 38 of the base 17 of the brackets 16 and the turning ring 22 to then engage under the thrust of a spring 39 with sawtooth indentations 40 on the outer wall of the supporting structure 10 (FIG. 2), said indentations being made in such a manner as to allow, with the pin 37 engaged, rotation of the ring 22 in the connecting direction but not in the opposite direction. With the pin 37 function together two fingers 41 which protrude sidewise from the turning brackets 14 and engage themselves under the two opposite sides of a T-head 42 of the pin 37 (FIG. 2). These parts are made in such a manner that the fingers 41 leave the pin 37 engaged in a sprung manner in the teeth 40 as long as the piston in cylinder 27 is retracted (or is in the shortening phase) as shown in FIG. 2 while they force it to rise and then disengage when the piston in cylinder 27 in the extension phase brings about rotation of the brackets 14 from the position shown in FIG. 2.

Each of the control bars 21 in turn supports and drives in a central opening therein one of three parallelepiped locking segments 30 having vertical bevels 31. Segments 30 slide transversely to the seats described by the sliding bases 19 and by the covers 20 and in oblique and radially converging directions toward the axis of the union (FIGS. 1 and 3), when the bars 21 are retracted axially to the right from the position shown in FIG. 7 to those shown in FIG. 1.

As shown in FIGS. 1 and 3 to and 5 each segment 30 has two opposing sides each equipped with spaced, parallel oblique (i.e. oblique to the axis of union body 1) teeth 32 engaged with (seated slidably between) similar parallel oblique teeth 33 formed in each of the confronting side surfaces of the central opening in the respective control bar 21. In this manner axial translation of the bar 21 is converted into a corresponding radial oblique translation, with an axial component parallel to and concordant with that of said axial translation, of the respective segment 30 which can thus draw near to or withdraw from the flange 3 of the pipe 2 respectively to clamp it in connected condition against the flange 5 of the union by means of the vertical bevels 31 (FIG. 1) or to allow its withdrawal for disconnection of the pipe 2 from the union 1 (FIG. 7).

As shown in FIG. 1 there is provided a centering system for the pipe 2 which consists of a front mouthpiece 34 of the flange 5 having a conical internal face 35. On said extension 34 the supporting structure 10 is supported through a ringer bush 36.

From the described structure derives the following mode of operation of the union illustrated in the drawings and in general of the union in accordance with the invention.

When at rest the hydraulic cylinder 27 is extended and the various locking assemblies 9 are in the condition shown in FIG. 1 with all the control bars in advanced position and all the locking segments 30 in the corresponding position removed from the union axis.

In this condition a pipe 2 with a flange 3 can draw near to the union 1, more precisely to the flange 5, and be placed in a position centred by the anular mouthpiece 34. At this point the hydraulic cylinder 27 is shortened to cause rotation of the turning ring 22 (in the direction allowed by the conformation of the teeth 40) and consequently translation of the control bars 21 from the advanced position shown in FIG. 7 to the retracted position shown in FIG. 1 and through the toothed coupling 32, 33 the corresponding oblique approach translation of the locking segments 30.

Being engaged from behind by vertical bevels 31 of the locking segments 30 the flange 3 of the pipe 2 is consequently thrust and clamped against the flange 5 of the union 1 to create a sealing engagement with the seal ring 7.

From the connected condition thus achieved the flange 3 cannot be moved except by a disconnecting command. A severe load applied during service cannot bring about undesired disconnection because given the slope of the locking segments 30 and their engagement with the sliding seats 19 and 20 and the control bars 21 such a stress is converted into a blocking stress on the segments 30 in relation to the seats 19, 20 and hence blocking of the sliding of the control bars 21.

Any vibrations of any origin whatsoever cannot bring about unlocking of the quick connection device given the one-way engagement of the pin 37 (FIG. 1) in the saw-tooth indentations 40.

It should be noted that if the flange 3 of the pipe to be joined is perfectly coplanar and of uniform thickness as shown in FIG. 1 the engagement between the supporting structure 10 and the spherical surface 8 causes the supporting structure 10 of the quick connection device and in general the entire device to arrange themselves in a symmetrical position in relation to the axis of the union.

If the flange 3 is slightly out of coplanarity or of variable thickness as shown in FIG. 8 the quick connection device rotates and self-centers itself correspondingly along the spherical surface 8, adapting its position to the defect encountered.

Perfect connection of the union 1 to the pipe 2 is thus always achieved.

To disconnect the pipe 2, in general without any applied load, it is necessary to operate the hydraulic cylinder 27 in the opposite direction. Its extension from the condition shown in FIG. 2 brings about a small initial rotation of the brackets 14 around the fulcrum 15 and consequently lifting of the pin 37 and disengagement thereof from the teeth 40. Further extension of the cylinder 27 can therefore bring about rotation of the ring 22 in the disconnecting direction so that the control bars 21 and the locking segments 30 are driven to return to the rest position shown in FIG. 7.

What is claimed is:

1. A quick connection union for a pipe with an end flange, comprising a union body, and a quick connection device for connecting said union body to the end flange of said pipe, said device comprising an annualr supporting structure having thereon a plurality of movable connecting elements disposed to thrust and lock said end flange against said union body, and characterized in that said supporting structure is releasably engaged in a self-centering manner with a substantially segmental-spherical reaction surface formed on the union body coaxially thereof, and characterized in that said connecting elements consist of a plurality of locking segments slidably engaged with axially movable control bars through cooperating, parallel teeth formed on confronting surfaces of said segments and said control bars, respectively, said teeth being inclined obliquely to the axis of said union body and being operative to convert the axial movement of said bars into a corresponding oblique, radial translational movement of said locking segments.

2. A union in accordance with claim 1 characterized in that said locking segments have thereon vertical bevels for engagement with said end flange of the pipe.

3. A union in accordance with claim 1 characterized in that said structure is provided with spaced seats for guiding said locking segments for movement in a sliding manner in said oblique direction and in such a way as to block themselves against said seats in case of an axially applied load on said pipe.

4. A union in accordance with claim 1 characterized in that said control bars at one end are engaged through teeth thereon with screw threads formed on the periphery of a single drive member consisting of a rotatable turning ring borne by said supporting structure around said union body.

5. A union in accordance with claim 4, including means for blocking said turning ring in position to cause engagement of said locking segments with said pipe flange, said blocking means comprising a sliding pin which traverses said turning ring and is resiliently stressed in engagement with a sawtoothed identation of said supporting structure, and control means for disengaging said pin from said indentation to permit rotation of said turning ring into position to cause disengagement of said locking elements from said end flange.

6. A union in accordance with claim 5 characterized in that, said control means consist of protrusions on turning brackets placed between the turning ring and a hydraulic control cylinder, said protrusions being engagable with said pin in such a manner as to bring about lifting of said pin following advance of the piston of said cylinder in a direction to rotate the turning ring.

* * * * *